(12) United States Patent
Ozanoglu et al.

(10) Patent No.: US 9,729,075 B2
(45) Date of Patent: Aug. 8, 2017

(54) HIGH EFFICIENCY DC-TO-DC CONVERTER WITH ADAPTIVE OUTPUT STAGE

(71) Applicant: Dialog Semiconductor (UK) Limited, Reading (GB)

(72) Inventors: Kemal Ozanoglu, Istanbul (TR); Selcuk Talay, Istanbul (TR)

(73) Assignee: Dialog Semiconductor (UK) Limited, Reading (GB)

( * ) Notice: Subject to any disclaimer, the term of this patent is extended or adjusted under 35 U.S.C. 154(b) by 0 days.

(21) Appl. No.: 14/712,941

(22) Filed: May 15, 2015

(65) Prior Publication Data

US 2016/0336855 A1 Nov. 17, 2016

(51) Int. Cl.
*H02M 3/158* (2006.01)
*H02M 3/157* (2006.01)
*H02M 3/156* (2006.01)
*H02M 3/335* (2006.01)
*H02M 7/00* (2006.01)

(52) U.S. Cl.
CPC .................................. *H02M 7/003* (2013.01)

(58) Field of Classification Search
CPC ............... H02M 3/158; H02M 3/1584; H02M 2001/0048; H02M 2001/0054; H02M 2003/1586; H02M 3/156; H02M 3/157; H02M 2003/1566; H02M 3/1588; H02M 3/33515; H02M 3/33507; H02M 2001/0025
USPC .................................................. 323/282, 288
See application file for complete search history.

(56) References Cited

U.S. PATENT DOCUMENTS

| RE44,587 E | 11/2013 | Qiu et al. | |
|---|---|---|---|
| 8,618,783 B2 | 12/2013 | Oki | |
| 2007/0124620 A1* | 5/2007 | Miyazaki | G03B 21/14 713/323 |
| 2008/0001553 A1* | 1/2008 | Qiu | H02M 3/1588 315/307 |
| 2009/0046487 A1* | 2/2009 | Emira | H02M 3/158 363/78 |

(Continued)

OTHER PUBLICATIONS

"Fully-Integrated On-Chip DC-DC Converter With a 450X Output Range," by Sudhir S. Kudva et al., IEEE Journal of Solid-State Circuits, vol. 46, No. 8, Aug. 2011, pp. 1940-1951.

(Continued)

*Primary Examiner* — Adolf Berhane
*Assistant Examiner* — Sisay G Tiku
(74) *Attorney, Agent, or Firm* — Saile Ackerman LLC; Stephen B. Ackerman

(57) ABSTRACT

A circuit and method for providing an improved efficiency for a DCDC converter. A power converter, comprising a buck converter comprising an adaptive output, an adaptive transconductance block configured to evaluate resistive power terms, a multiplier block configured to provide capacitive power terms, and a comparator configured to compare resistive power and capacitive power terms for determining the selection of the branches of said adaptive output. The method for improved efficiency includes providing a switching converter with an adaptive output stage comprising the steps of providing a switching converter, evaluate capacitive power loss, evaluate resistive power loss, compare capacitive power loss and resistive power loss, and lastly adapting the output stage size.

35 Claims, 13 Drawing Sheets

(56) References Cited

U.S. PATENT DOCUMENTS

| | | | | |
|---|---|---|---|---|
| 2009/0274321 A1* | 11/2009 | Doppel | ............... | H03G 3/004 |
| | | | | 381/104 |
| 2011/0309807 A1* | 12/2011 | Couleur | ............ | H02M 3/1584 |
| | | | | 323/272 |
| 2012/0274301 A1* | 11/2012 | Nakashima | ........ | H02M 3/1588 |
| | | | | 323/284 |
| 2016/0087532 A1* | 3/2016 | Stanzione | ............ | H02M 3/158 |
| | | | | 323/271 |

OTHER PUBLICATIONS

"Improvement of Light-Load Efficiency Using Width-Switching Scheme for CMOS Transistors," by Surya Musunuri et al., IEEE Power Electronics Letters, vol. 3, No. 3, Sep. 2005, pp. 105-110.

"High Power-Density, Hybrid Inductive/Capacitive Converter with Area Reuse for Multi-Domain DVS," by Sudhir Kudva et al, 2014 IEEE, pp. 1-4, Sep. 15-17, 2014.

"A Unified Framework for Capacitive Series-Parallel DC-DC Converter Design," by Ramesh Harjani et al., 2014 IEEE, pp. 1-8, Sep. 15-17, 2014.

* cited by examiner

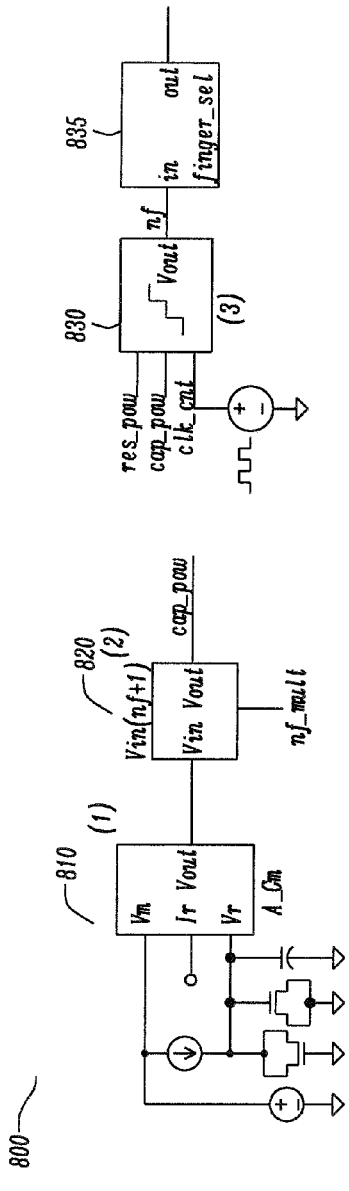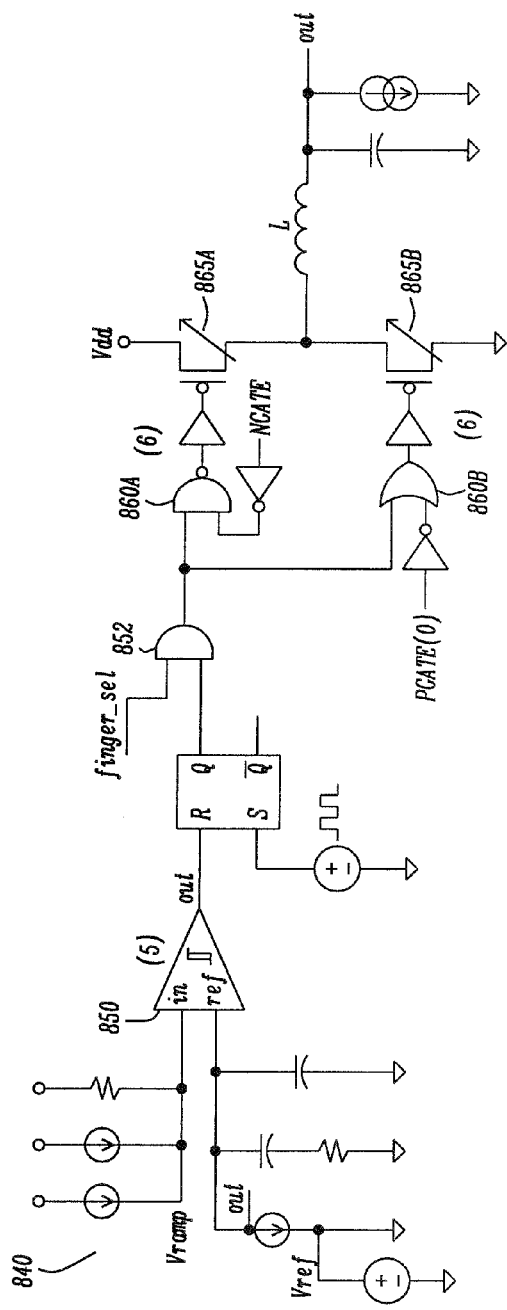
FIG. 8A
FIG. 8B

HIGH EFFICIENCY DC-TO-DC CONVERTER WITH ADAPTIVE OUTPUT STAGE

BACKGROUND

Field

The disclosure relates generally to a dc-to-dc voltage converter and, more particularly, to an switching converter circuits with improved efficiency at light load conditions thereof.

Description of the Related Art

Switching converters for battery operated systems are required to source load currents. The load currents of interest are from a range of 0 to 10 A. Additionally, the converter has to sustain an excellent power efficiency and be able to support load current switching from 0 A to the maximum current, $I_{max}$, with a minimum output voltage ripple.

As an example, FIG. 1 highlights the sources of power loss for a synchronous buck converter. In heavy load operation, the conduction losses dominate. FIG. 1. shows a synchronous buck converter 100. The synchronous buck converter 100 comprises a p-channel metal oxide semiconductor field effect transistor (MOSFET) 110 and a n-channel MOSFET 120. A pre-drive includes a p-channel MOSFET pre-drive circuit 115 and n-channel MOSFET pre-drive circuit 125. The synchronous inverter circuit includes an inductor 130 and capacitor 140. The output includes a load 150. The input has a power supply Vin 160 in parallel with an input capacitor 165. A feedback loop electrically couples the output vout(t) with a Controller 170, which feeds a signal to the pre-drive elements 115 and 125.

The conduction losses as highlighted in FIG. 1 include the MOSFET switching and conduction losses of the p-channel MOSFET device 110, and body-diode losses of the n-channel MOSFET 120. The losses from the passive elements include the electrical series resistance (ESR) loss of the input capacitor, 165, the electrical series resistance (ESR) of the inductor 130, and the electrical series resistance (ESR) loss of the output capacitor 140.

Therefore, metal oxide semiconductor field effect transistors (MOSFETs) with low on-resistance (Ron) and a low electrical series resistance (ESR) inductor are needed to meet efficiency specifications. However under light-load conditions, MOSFET switching and gate-drive losses become significant, especially for integrated converters with operation frequency beyond several MHz. As a result, the efficiency degrades as the load current decreases. Light-load efficiency is a major concern in applications where the digital load ICs spend the majority of their time in idle mode.

Various techniques have been presented in order to reduce switching losses in light-load condition, which can be classified in two categories: variable frequency techniques and adaptive output stages.

Variable frequency techniques include pulse frequency modulation (PFM), pulse-skip (PS), and burst-mode control. The disadvantage of these techniques is that they generally lead to poor output voltage regulation due to the load dependence of source frequency (fs). These variable frequency techniques also have a concern with electromagnetic interference (EMI).

In the adaptive output stage technique, the switching converter output stage is defined as segments (e.g. or also referred to as fingers) wherein portions of the adaptive output stage can be turned off at light-load conditions to optimize the trade-off between the effective gate capacitance and the on-resistance, $r_{ON}$. This is also known as the "switched-width" concept. Segmentation is practically achieved by separating the MOSFET gate structure of power MOSFET cells in the physical design layout, while the MOSFET drain and source metallization pattern remains unchanged.

FIG. 2A shows a circuit schematic of segmented output stage 200. The circuit in FIG. 2A comprises of a power stage with MOSFET of various widths providing segmentation illustrated by example as 210 (i), 210 (j), 210 (k) to 210 (n). The logic gates 230 (i), 230 (j), 230 (k) to 230 (n), are electrically coupled to the power stage of MOSFETs 210 (i), 210 (j), 210 (k) to 210 (n). The output of the power stage is connected to inductor 240, capacitive load 250, resistive load 260 with an output signal 280. The input signal 270 is connected to the logic gates 230 (i) to 230 (n).

The typical implementation of an adaptive output stage is monitoring the output current and setting the number of active stages using a pre-defined load current threshold, which are previously calculated values for typical operation parameters. Similarly, switching from synchronous mode to PFM mode is usually defined by a pre-defined load current threshold. However, various other operation condition dimensions also have to be considered. For example, switching losses are not a constant magnitude; it is a function of input voltage (which can change more than two orders of magnitude), gate capacitance and operating frequency.

Assuming these parameters are constant throughout the circuit operation, the parameters will cause significant errors deviating the system from operating with optimal efficiency. In addition, the effects such as aging, process variations or temperature significantly affect switch transistor "on resistance" ($r_{ON}$); this can generate estimation errors (e.g. on resistive losses), which all result in non-optimal efficiency for the switching converter.

U.S. Pat. No. 8,618,783 to Oki, describes a DC-to-DC converter with a method of adaptive phase compensation.

In IEEE Custom Integrated Circuits Conference to S. Kudva, S. Chaubey, and R. Harjani, titled "High Power-Density Hybrid Inductive/Capacitive Converter with Area Reuse for Multi-domain DVS," (September 2014), describes a converter with inductive converter for large loads, and capacitive converter for lower loads.

In IEEE Custom Integrated Circuits Conference to R. Harjani and S. Chaubey, titled "A Unified Framework for Capacitive Series-Parallel DC-DC Converter Design," (September 2014), describes methods for DC-DC conversion.

U.S. Pat. No. RE44587 E1 to Qui et al, describes a dc-dc converter with a drive stage that is adaptive.

In IEEE Power Electronics Letters, to S. Musunuri and P. Chapman, titled "Improvement of Light-Load Efficiency Using Width-Switching Scheme for CMOS Transistors," IEEE Power Electronics Letters, Vol. 3, pp. 105-110 (September 2005), describes a method of width switching that utilizes segmentation of the output stage for light load efficiency.

In Journal of Solid State Circuits, to S. Kudva and R. Harjani, titled "Fully-Integrated On-Chip DC-DC Converter With a 450× Output Range," JSSC, Vol. 46, No. 8, pp. 1940-1951, August 2011, describes an apparatus with a wide power range for dynamic voltage scaling (DVS).

In these prior art embodiments, the solution to establish a sampling circuit in switching regulator utilized various alternative solutions.

SUMMARY

It is desirable to provide a solution to address an efficient DC-to-DC regulator with minimal power loss.

It is desirable to provide a solution with a comparative technique which compares capacitive and resistive power losses.

It is desirable to provide a solution with a capacitive (switching) loss information calculation technique.

Another further object of the present disclosure is to provide a solution with a capacitive (switching) loss information calculation technique taking into account input supply voltage, operating frequency and gate capacitance.

It is desirable to provide a solution with a resistive loss information calculation technique.

Another further object of the present disclosure is to provide a solution with a resistive loss information calculation technique for the comparator taking into account actual $r_{ON}$ information and load current therefore compensating process, aging and temperature effects.

A principal object of the present disclosure is to provide a novel adaptive output stage size selection technique which will decide on active number of output stage segments by comparing capacitive (switching) and resistive power losses; taking into account: input supply voltage, operating frequency, gate capacitance, actual $r_{ON}$ information and load current, finding the optimal efficiency for the switching converter in all possible operation-life conditions compensating device variations due to aging, process, and temperature.

In summary, a power converter comprising an adaptive output, a first adaptive transconductance block configured to evaluate resistive power terms, a second adaptive transconductance block configured to provide capacitive power terms, and a comparator configured to compare the resistive power terms and the capacitive power terms for determining the selection of branches of said adaptive output.

In addition, a second embodiment of a synchronous switching converter with an adaptive output stage comprising an adaptive transconductance block configured to evaluate resistive power terms, a multiplier block configured to provide capacitive power terms, a first comparator configured to compare resistive power and capacitive power terms for determining the selection of the branches of said adaptive output, and a second comparator configured to compare resistive power and capacitive power terms for determining the selection of the branches of said adaptive output.

In addition, a third embodiment of a circuit providing a synchronous switching converter with an adaptive output stage comprising a current sense and slope ramp, an error amplifier, a compensation network, a buck SR flip flop, a first and second adaptive output pre-driver, an output driver with a first and second output transistor electrically coupled to the first and second adaptive output pre-driver, an inductor electrically coupled to the output driver, an inductor current sense circuit electrically coupled to the inductor, an output capacitor, and a comparator network configured to evaluate the resistive power loss and the capacitive power loss.

In addition, a method is shown in accordance with the embodiment of the disclosure. A method of providing a switching converter with an adaptive output stage comprising the steps of a first step, (a) providing a switching converter, a second step (b) evaluate capacitive power loss, a third step (c) evaluate resistive power loss, a fourth step (d) compare capacitive power loss and resistive power loss, and a fifth step (e) adapting the output stage size.

Other advantages will be recognized by those of ordinary skill in the art.

BRIEF DESCRIPTION OF THE DRAWINGS

The present disclosure and the corresponding advantages and features provided thereby will be best understood and appreciated upon review of the following detailed description of the disclosure, taken in conjunction with the following drawings, where like numerals represent like elements, in which:

FIGS. 8A, 8B, and 8C are circuit schematics in accordance with the second embodiment of a synchronous buck converter with a single comparators; and, FIG. 9 is a method in accordance with the first embodiment of the disclosure.

DETAILED DESCRIPTION

The disclosure provides a novel adaptive output stage size selection technique which will decide on active number of output stage segments. By comparing capacitive (switching) and resistive power losses (taking into account input supply voltage, operating frequency, gate capacitance, actual $r_{ON}$ information and load current), the optimal efficiency for the switching converter in all possible operation-life conditions compensating device variations due to aging, process, temperature is obtained.

The present disclosure includes an adaptive width output stage for a DCDC converter. A comparison technique which compares capacitive (switching) and resistive power losses is utilized. The capacitive (switching) loss information calculation technique takes into account the input supply voltage, operating frequency and gate capacitance. The resistive loss information calculation technique for the comparator takes into account the actual $r_{ON}$ information and load current, therefore compensating process, aging and temperature effects.

It is possible to monitor ron of pass devices e.g. through the voltage drop on LX node, as we also can measure load current, ron=$\Delta V_{onLX}/I_{LOAD}$. Assuming the synchronous mode (PWM mode), and assuming Vin (vbat) is constant, then if ron of pass devices are changing (sharply) with load current, $I_{LOAD}$, then the adaptive output stage exists. If, assuming Iload is constant, and ron of pass device is changing with Vin in a non-monotonic way, then there is an additional control loop manipulating the adaptive output stage, which takes into account Vin. After gathering some data on load current, $I_{LOAD}$, the input voltage, Vin, and adaptive output stage sizing, then the criteria can be established and the operability of an additional control loop can be evaluated. If the control loop is comparing resistive power to capacitive power, then it is using the basic principle defined in this disclosure.

Capacitive power loss of a switching MOSFET with number of fingers $n_f$ and assuming first order approximation given by:

$$P_C = n_f C_{gg} f V_{DD}^2 \quad (1)$$

Resistive power loss of a MOSFET with number of fingers $n_f$ and assuming first order approximation given by:

$$P_R = \frac{I_L^2 r_{on}}{n_f} \quad (2)$$

where $r_{on}$ is the switch resistance and $I_L$ is the drain current.

Figure 1:
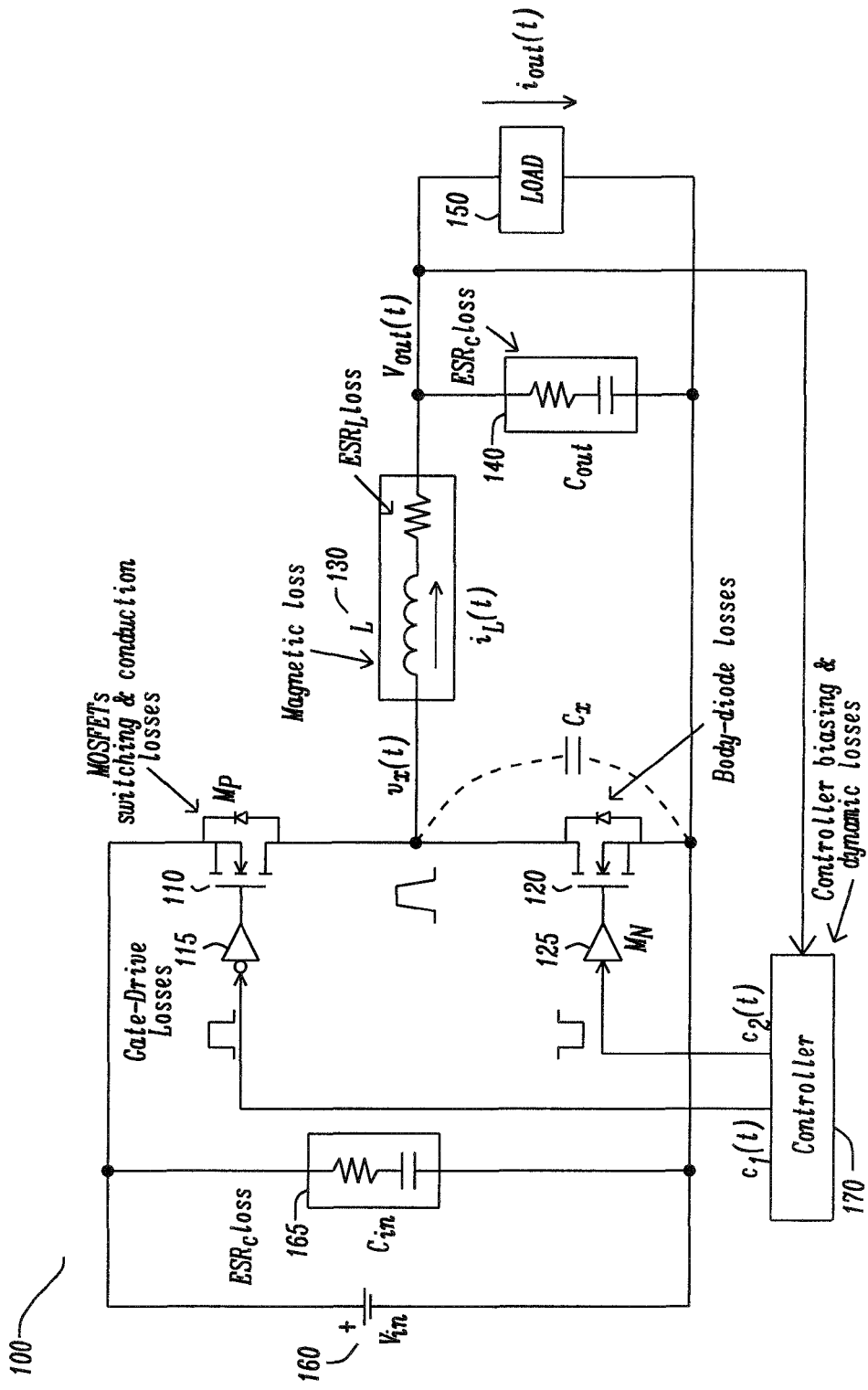
FIG. 1 is a circuit schematic of a prior art of a synchronous buck converter highlighting sources of power loss.
Figure 2A:
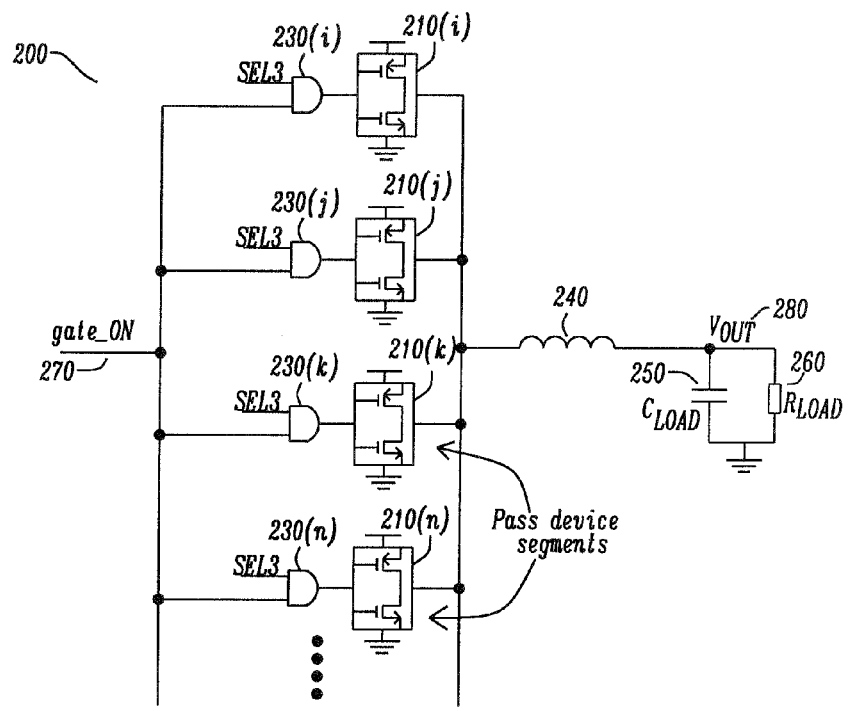
FIG. 2A is a circuit schematic of an adaptive output stage.
Figure 2B:
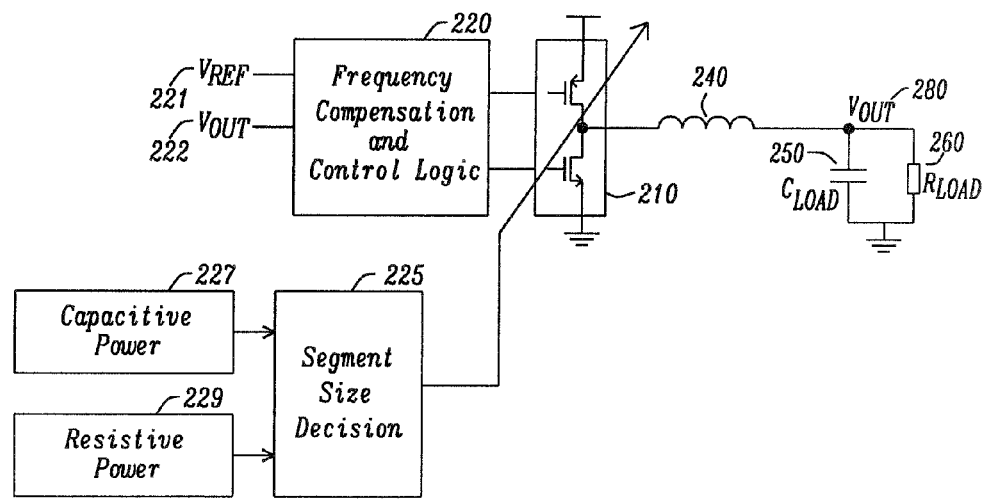
FIG. 2B is a circuit schematic of an adaptive output stage modified based on capacitive and resistive power loss.

FIG. 2B is a circuit schematic of an adaptive outputs stage modified based on capacitive and resistive power loss. FIG. 2B shows the adaptive segmented output stage 210, Frequency Compensation and Control Logic block 220, and a functional block for decision of segment size 225. As in FIG. 2A, the inductor 240, capacitive load 250 and resistive load 260 are electrically coupled to the output voltage VOUT 280. The Frequency Compensation and Control Logic block receives input signals from reference voltage VREF 221, and output voltage VOUT 222. The functional block that decides the segment size receives an input signal associated with capacitive power 227, and resistive power 229.

Figure 3:
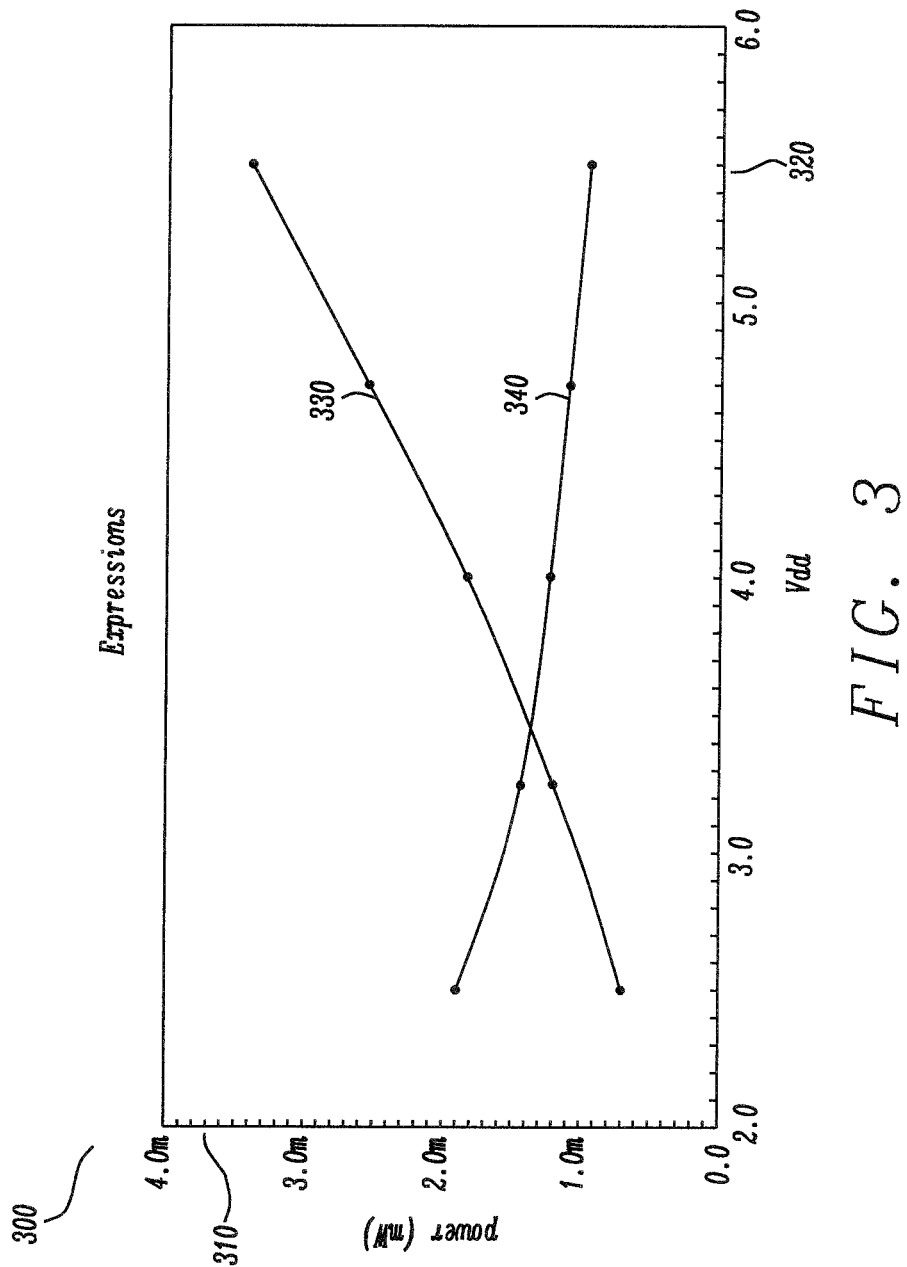
FIG. 3 is a plot of capacitive and resistive power loss of a typical output driver transistor.

FIG. 3 compares capacitive and resistive power loss of a typical buck driver transistor (L=0.25 u) for $I_L$=100 mA and $V_{DD}$ sweeping from 2.5V to 5.5V. This is a typical supply voltage range for single-cell battery operated portable systems.

The proposed adaptive output stage will decide on active number of segments (fingers) by comparing capacitive and resistive power losses, and reaching optimum efficiency by i.e. increasing the number of segments when load current (thus resistive loss) increases.

The proposed comparison procedure is as follows:

$$P_C <> P_R \quad (3)$$

$$n_S C_{gg} f V_{DD}^2 <> \frac{I_L^2 r_{on}}{n_S} \quad (4)$$

we will define a capacitor current $I_C$ such that $$I_C = \frac{C_{gg} V_{DD}}{t} \quad (5)$$

where t is 1/f. Also considering $$I_L \frac{r_{on}}{n_S} = V_{sense} \quad (6)$$

where $V_{sense}$ is the average voltage drop on the driver transistor drain and source terminals. Equation (4) now can be expressed as:

$$n_S I_C V_{DD} <> I_L V_{sense} \quad (7)$$

dividing both sides of the expression (to achieve a current comparator) we get:

$$n_S I_C <> V_{sense} \frac{I_L}{V_{DD}} \quad (8)$$

where $V_{sense} I_L / V_{DD}$ is to be implemented as an adaptive gm block. The left hand side (LHS) of the equation $n_S \cdot I_C$ can be implemented as a current DAC with an input current of $I_C$ and $n_S$ as the number of selected branches.

Two possible methods are considered to generate current $I_C$ defined in (5). The first and more straightforward method is building a "current-locked-loop," where a varying current ($I_C$) charges a $C_{gg}$ capacitor in a given time t. The loop tries to adjust $I_C$ such that in the given time t, the voltage on the capacitor is equal to—i.e. half of $V_{DD}$, otherwise the loop changes $I_C$ accordingly.

A simpler method which is implemented and simulated in the next section is as follows:

We will define a capacitor voltage $V_{C2}$ such that:

$$V_{C2} = \frac{I_R t}{C_{gg}} \quad (9)$$

to be implemented as the voltage of a capacitor $C_{gg}$ charged by a reference current $I_R$ (i.e. 1 uA) for a time frame of t. $I_C$ will then be equal to:

$$I_C = \frac{I_R}{V_{C2}} V_{DD} \quad (10)$$

where $V_{DD} I_R / V_{C2}$ is to be implemented as an adaptive gm block and power supply voltage $V_{DD}$ as the input of this gm block.

Figure 4A:
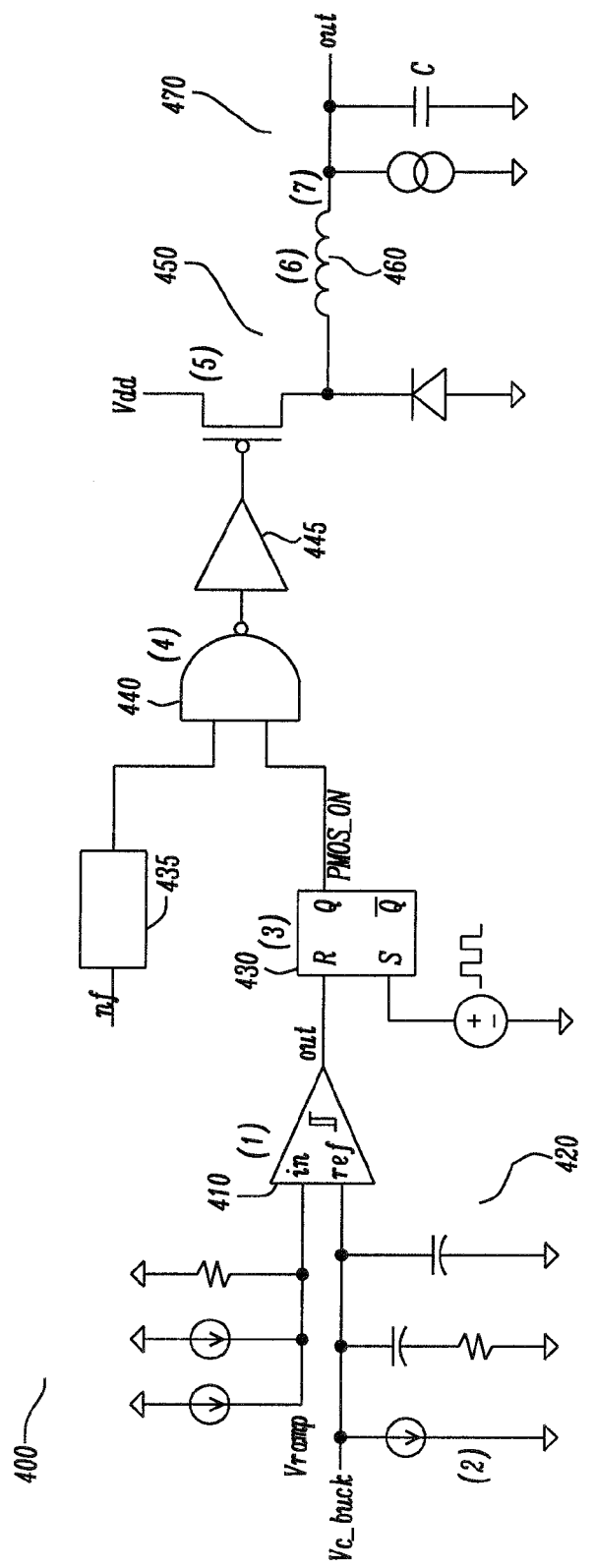
FIGS. 4A, 4B, and 4C are circuit schematics of the components and ideal elements in accordance with the first embodiment of the disclosure.
Figure 4B:
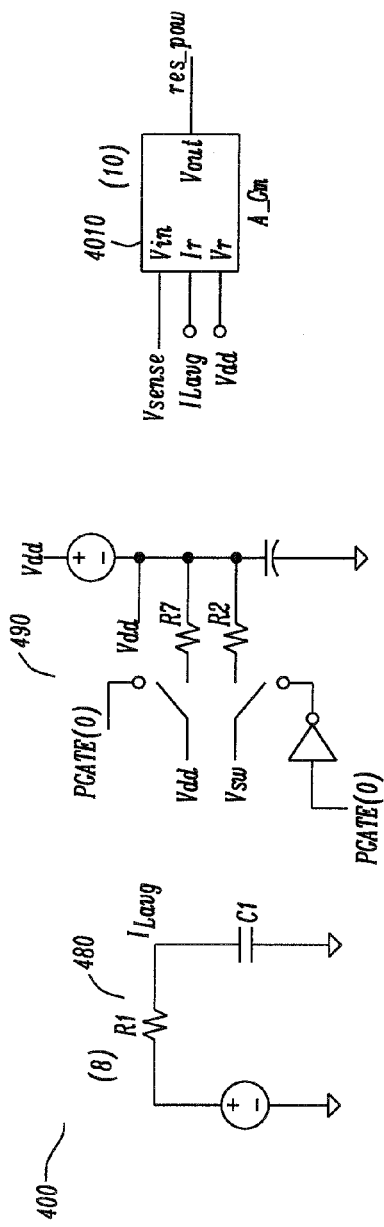
Figure 4C:
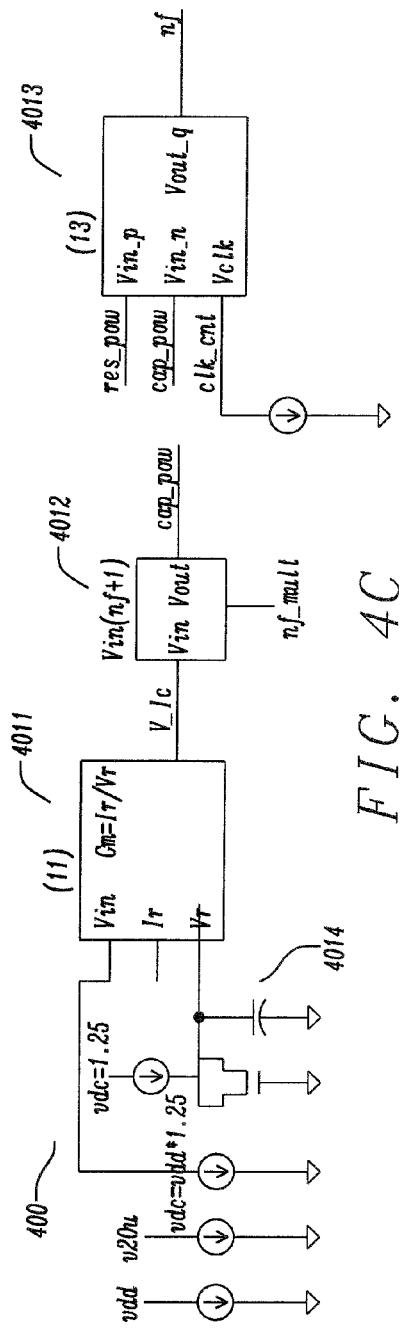

FIGS. 4A, 4B, and 4C are schematics of the components and ideal elements in accordance with the first embodiment of the disclosure. FIGS. 4A, 4B and 4C includes the elements as enumerated, the current sense and slope ramp for Buck converter 410
the Error amplifier and compensation network 420
Buck SR_FF to generate duty cycle 430
adaptive output stage pre-driver 440 and 445: SR_FF output is fed into 8 NAND gates which select the active PMOS driver transistors together with finger_sel decoder block (using nf) PMOS driver transistors 450, where the NMOS normally in the driver circuitry pull-down part of the driver is replaced with an ideal diode for simplicity, inductor and ideal current sense 460 output capacitor 470, average output current sense 480—here implemented by monitoring the inductor current and then through an RC filter, PMOS driver 490 voltage drop sense—implemented with ideal switches to sample ΔV when the transistor is ON, output of this block is $V_{sense}$ of equation-7. The load current divided by the power supply voltage, $I_L/V_{DD}$, is implemented as an adaptive gm block 4010 (in other terms Gm=$I_L/V_{DD}$), input of this block is $V_{sense}$, thus output of this block is $V_{sense} \times I_L/V_{DD}$ as defined in (Equation-8) to calculate resistive power term of the equation. Block 4011 for generating $I_C$, defined by Equation 9 and 10, where a current pulse of time duration t charges a PMOS capacitor Cgg, $I_R/V_{C2}$ is implemented as an adaptive gm block (Gm=$I_R/V_{C2}$) with $V_{DD}$ as the input of this gm block. Thus output of 11 will be $V_{DD} \times I_R/V_{C2}$ as defined in equation-10.

(11) The circuit block 4011 comprises inputs Vin, Ir and Vr, and whose output is V_Ic. The input signals 4014 include vdc generator vdc=1.25 vdd, a MOSFET in capacitor configuration and a pulse generator current source. The signals of 4014 include vdc signals, vdc=20 u, vdc=vdd, an vdc=1.25 vdd signals.

(12) The multiplier block 4012, where the output of 11 is multiplied by (nf+1) or number of selected stages. The output of the multiplier block 4012 is the capacitive power term of the equation (e.g. Equation 8).

(13) The comparator 4013 compares resistive power res_pow and capacitive power terms cap_pow and decides the number of selected branches (nf is the output). The comparator 4013 also includes a clock signal clk_cnt. In this simulation setup, the comparator is defined such that nf will increase by 1 if resistive loss is 20% more than capacitive loss and nf will decrease by 1 if resistive loss is 20% less than capacitive loss. The relationship between resistive loss and capacitive loss could range from 1% to 100%. At a lower limit of 1% or below, there will be too much toggling at the output of the (resistive loss vs. capacitive loss) comparator. At the upper limit of 100%, the disclosed circuit will be far from optimal efficiency operation (e.g. capacitive loss would be 80% more than resistive loss, but still the output of the comparator would not change).

This comparator can also be defined in different ways. The res_pow input is coupled to the vin_p, signal and the cap_pow input is coupled to the vin_n signal.

Figure 5:
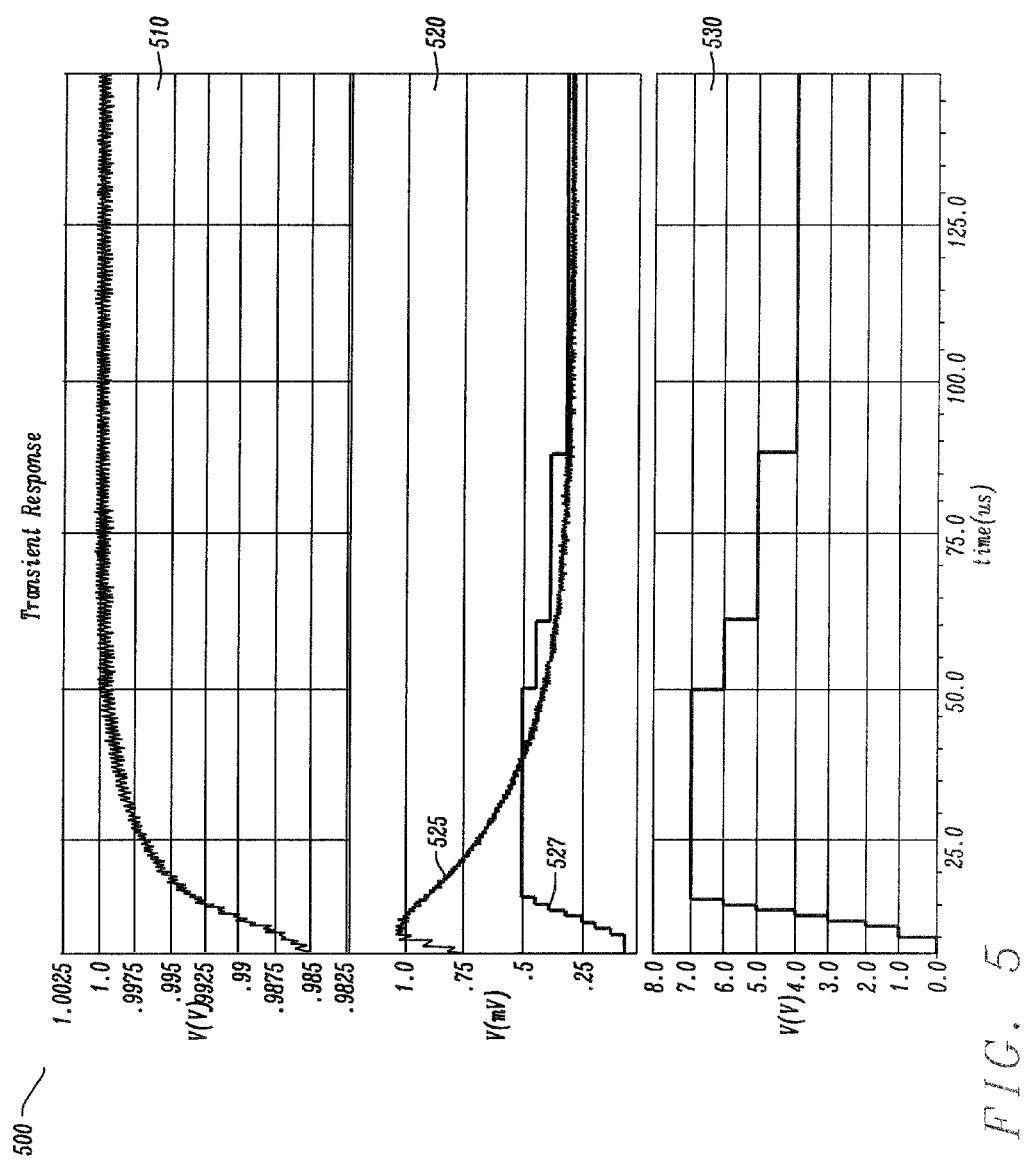
FIG. 5 is a plot of the simulation results of typical operation.

FIG. 5 is a plot of the simulation results 500 of typical operation 510, 520, and 530. Simulation results for typical operation (settling of nf) is given with FIG. 5 for output voltage 510. FIG. 5 plot 520 includes resistor voltage 525 and capacitor voltage 527. FIG. 5 plot 530 includes nf voltage. During simulation, the comparator compares resistive power loss and capacitive power loss and decides value of nf such that both losses are equal.

To verify operability, where the system is to find the right capacitive and resistive power loss values, the following analytical check is performed for the simulation case of FIG. 5, with the following extracted values and parameters:

Input cap of driver MOS/single stage=12 pF (biased at 2V)
Driver $r_{on}$/single stage=0.58Ω
frequency=1 MHz
Input voltage $V_{DD}$=5V
Load Current=0.25 A
Duty cycle at the given operating point=20.1%
selected number of stages=5 (nf=4, counting from 0)
cap_pow value=320 u (extracted from FIG. 5 527, output of block (12) 4012 of FIG. 4C.)
res_pow value=295 u (extracted from FIG. 5 525, output of block (10) 4010 of FIG. 4B.)

cap_pow value is actually left side of Eq. (8) where $$\text{cap\_pow} = \frac{P_C}{V_{DD}}$$

thus calculated capacitive power loss will be $P_{C,\ from\ simulation} = V_{DD} \times \text{cap\_pow} = 5 \times 320\ u = 1.6\ mW$ and using the formula for capacitive loss:

$P_c = n_s C_{gg} f V_{DD}^2 = 5 \times 12p \times 1M \times 25 = 1.5\ mW$ which are very close, the discrepancy is due to nonlinear capacitance characteristic of PMOS driver capacitance.

Similarly, res_pow is value actually right side of Eq. (8) where $$\text{res\_pow} = \frac{P_R}{V_{DD}}$$

thus calculated resistive power loss will be $P_{R,\ from\ simulation} = V_{DD} \times \text{res\_pow} = 5 \times 295\ u = 1.475\ mW$ and using the formula for resistive loss $$P_R = D \frac{r_{on}}{n_S} I_{LOAD}^2 = 0.201 \times (0.58\Omega/5) \times 0.25^2 = 1.457\ mW$$

which are also very close.

Figure 6:
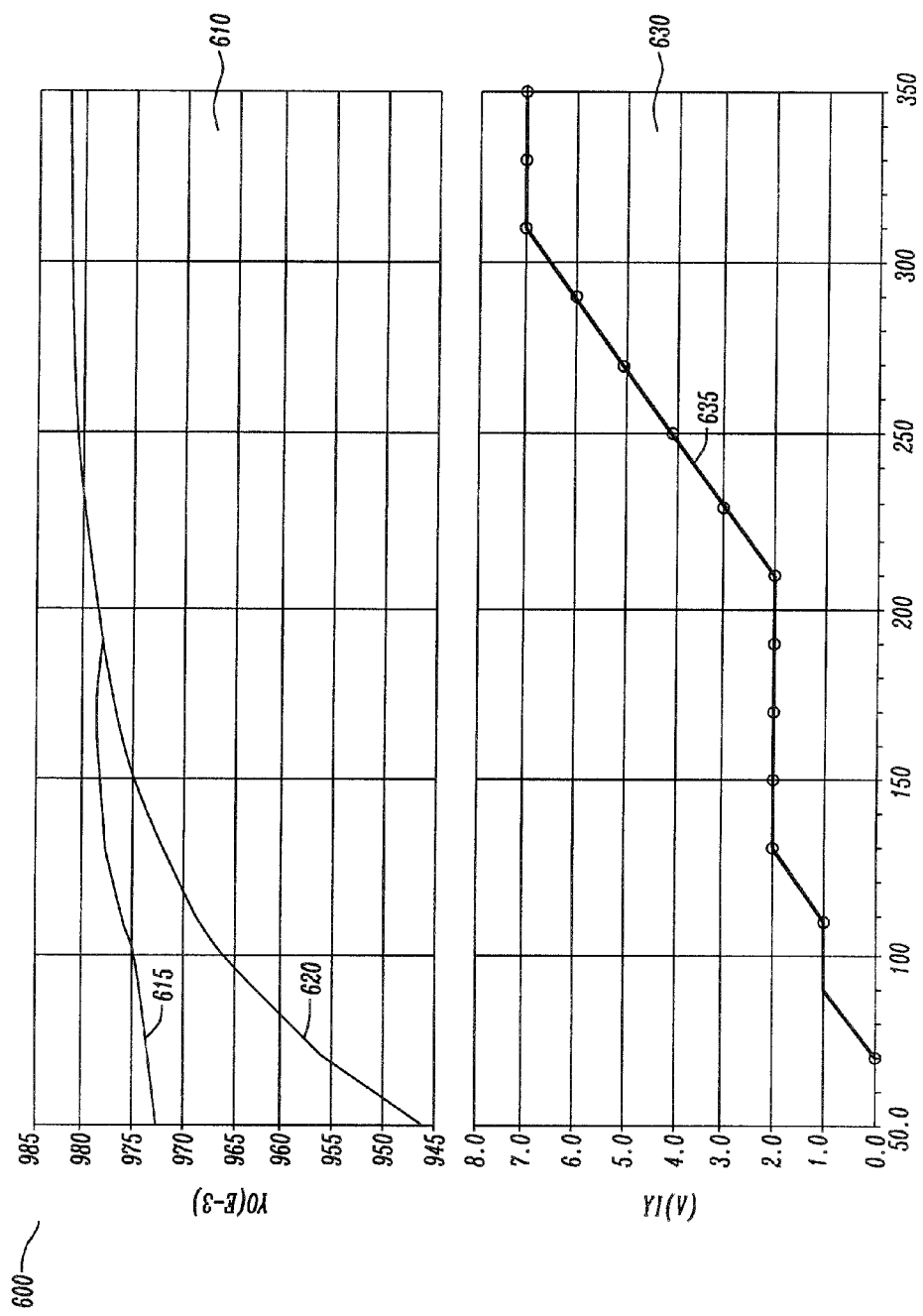
FIG. 6 is a comparison plot of the adaptive output stage buck and conventional buck converter.

FIG. 6 gives efficiency comparison plots 600 as a function of the current load including comparison of adaptive output stage and a conventional buck converter 610 and a second plot of number of fingers of 630. From the comparison of adaptive output stage buck efficiency 615 to conventional buck 620. The number of stages plot 630 for the adaptive output shows the changes of nf 635 as a function of the current load. The conventional buck converter 620 is for the case of a fixed number of stages (nf=7). Significant efficiency improvement can be observed at low load current regime.

Figure 7A:
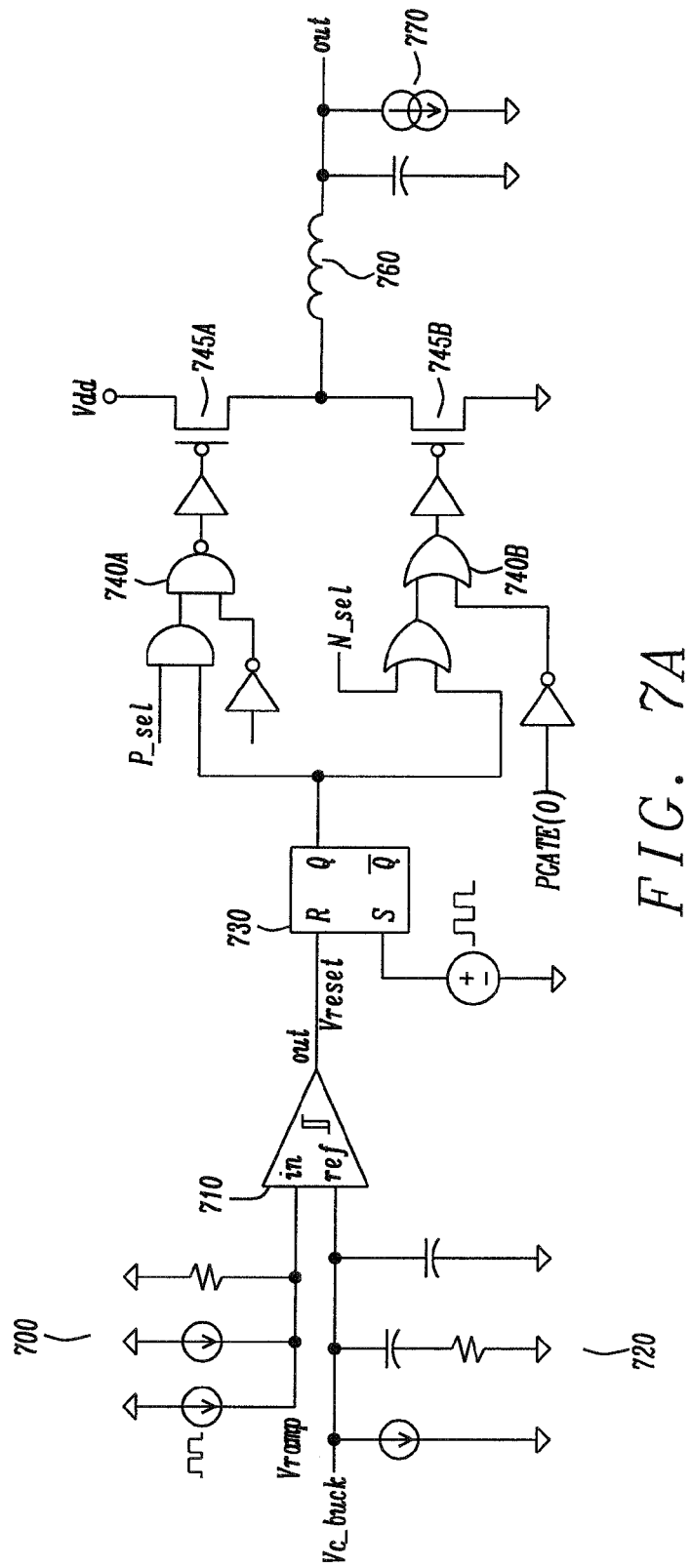
FIGS. 7A, 7B, and 7C are circuit schematics in accordance with the first embodiment of a synchronous buck converter with two comparators.
Figure 7B:
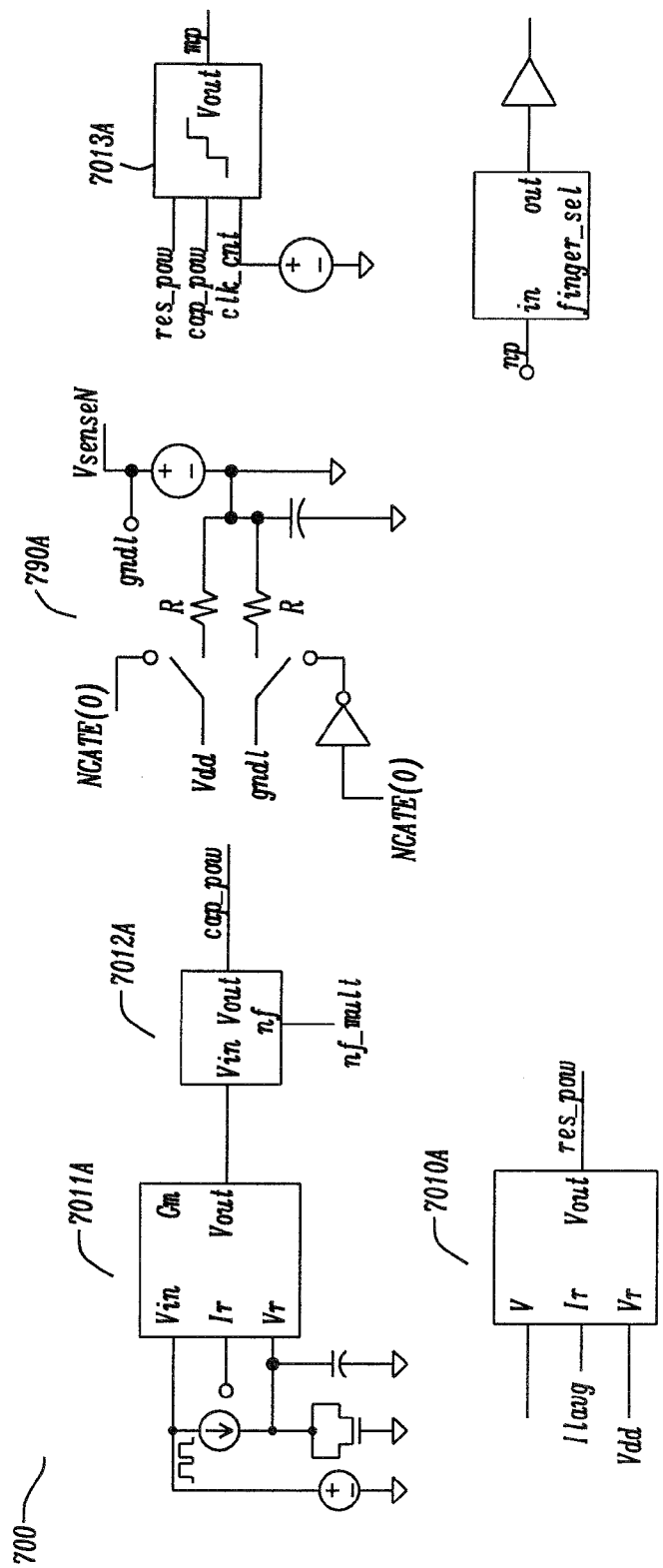
Figure 7C:
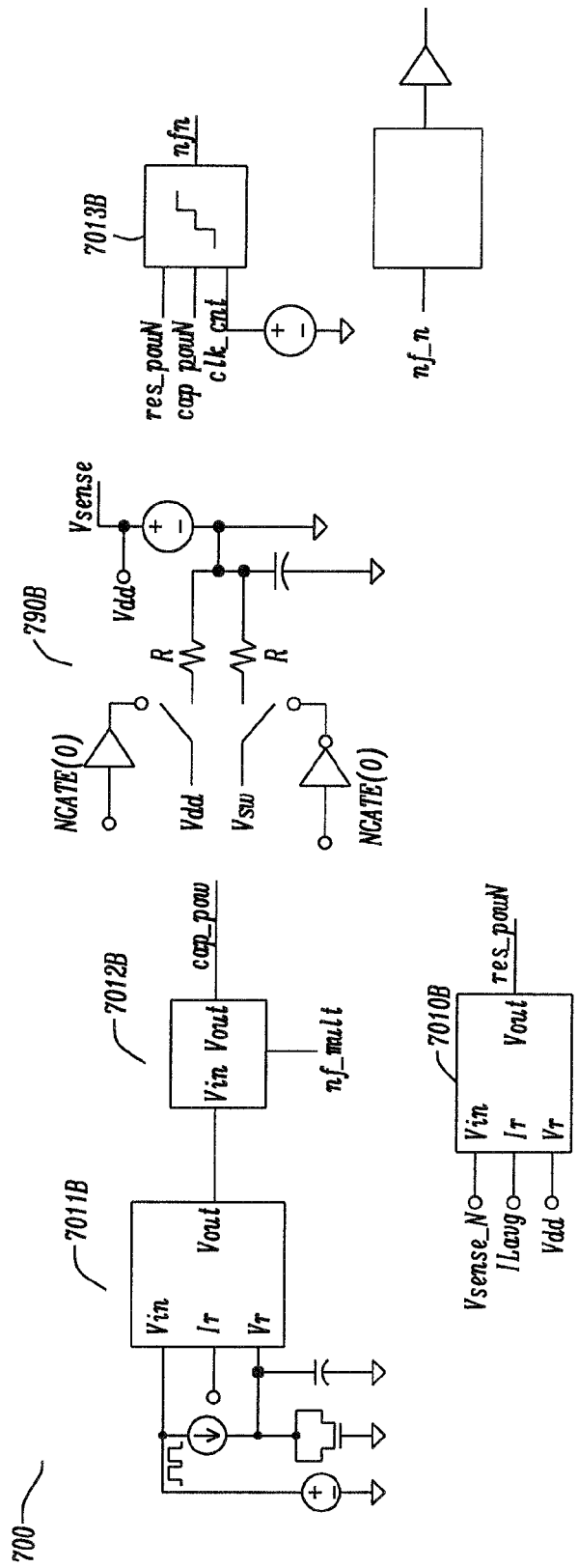

FIGS. 7A, 7B, and 7C a schematic of the components and ideal elements in accordance with the first embodiment of the disclosure. FIGS. 7A, 7B, and 7C includes the elements as enumerated:

(a) is the current sense and slope ramp for Buck converter 710,
(b) the Error amplifier and compensation network 720,
(c) the SR logic gate Buck SR_FF to generate duty cycle 730,
(d) first and second adaptive output stage pre-driver logic 740A and 740B, and pre-drivers 745A and 745B. SR_FF output is fed into 8 NAND gates which select the active PMOS driver transistors together with finger_sel decoder block (using nf),
(e) first and second driver transistors 750A and 750B,
(f) the inductor and ideal current sense 760,
(g) the output capacitor 770,
(h) the NGATE switch network 790A and 790B with two switches and two resistor elements,
(i) an adaptive block 7010A and 7010B with inductor current input, and vdd input to provide resistance power res_pow,
(j) a circuit block 7011A and 7011B, followed by block 7012A and 7012B, respectively,
(k) a comparator circuit block 7013A and 7013B comparing the resistive power res_pow, and the capacitor power cap_pow and clock signal clk_cnt and a finger selection block.

Figure 8C:
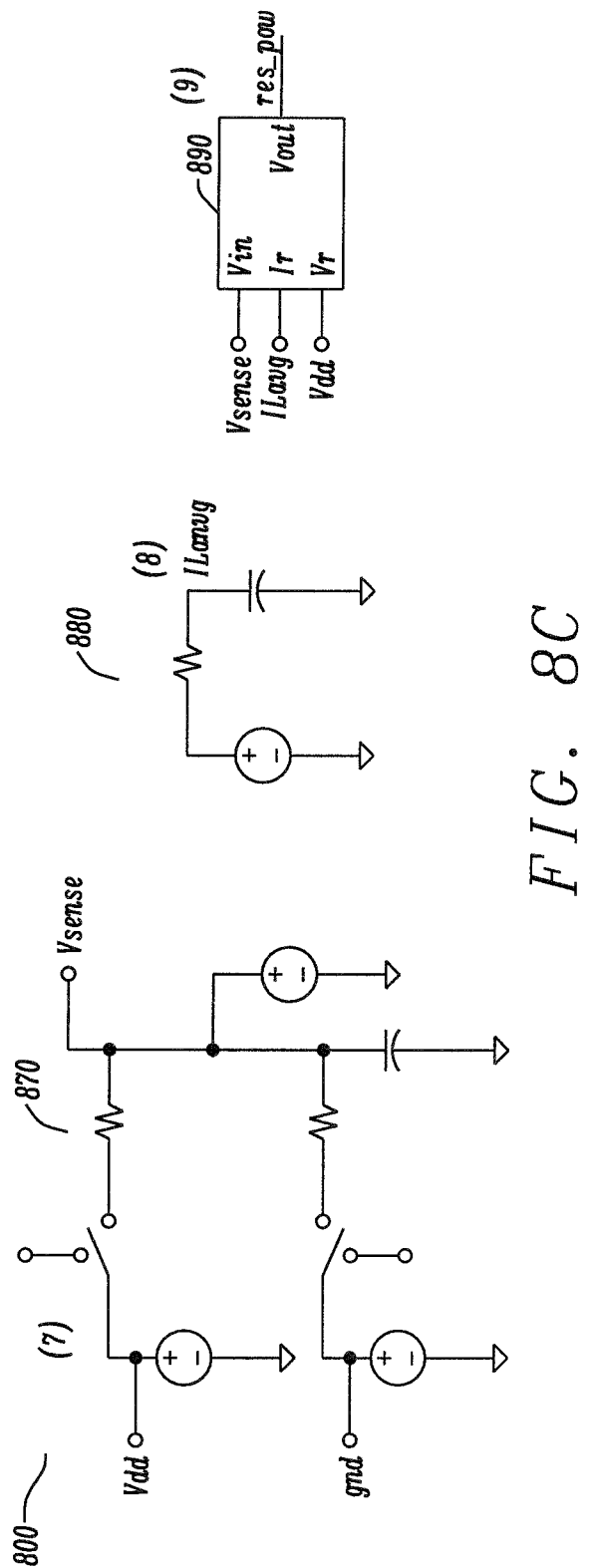
Figure 9:
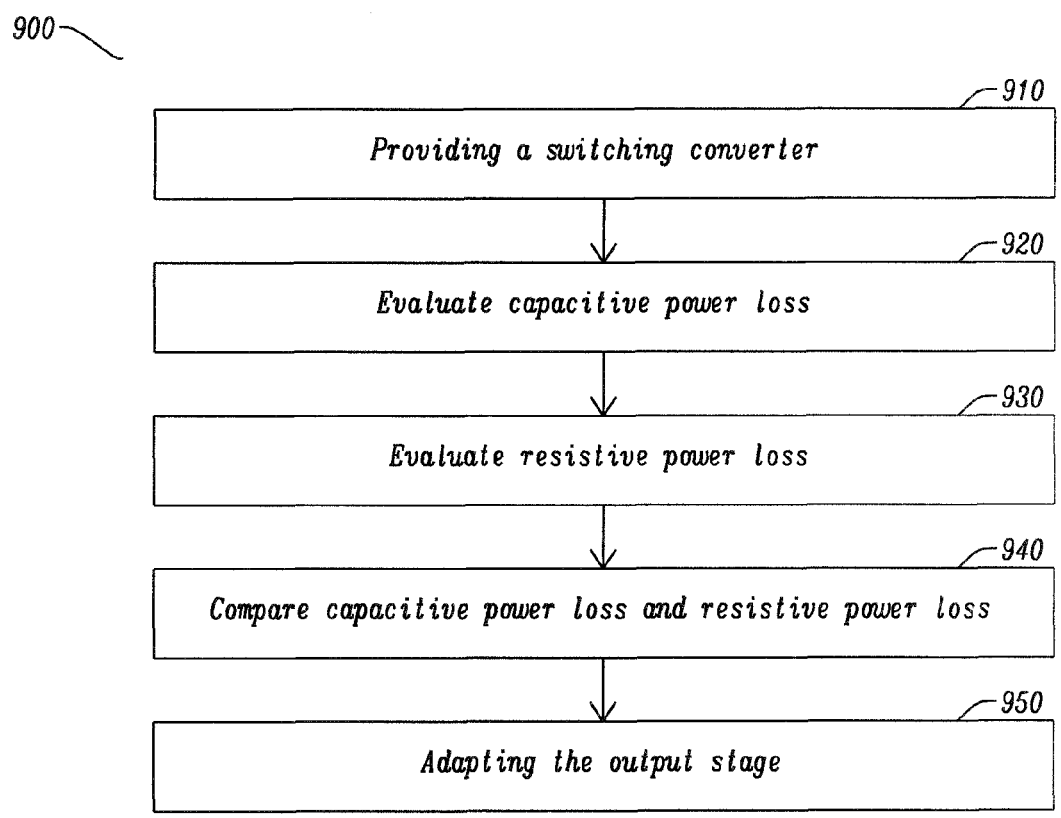

FIGS. 8A, 8B, and 8C a schematic 800 in accordance with the second embodiment of a synchronous buck converter with a single comparators. FIGS. 8A, 8B, and 8C gives an embodiment with a single comparator where capacitive and resistive loss of both pass devices are compared together. The adaptive segment comprises of an NMOS and PMOS unit pass device. In this embodiment, the capacitive loss is calculated for each switching cycle for an adaptive segment as well as the resistive loss utilizing:

$\Delta V = D' \times \Delta V_{PMOS} + D \Delta V_{NMOS}$ or $\Delta V = I_{sense} \times (D' \times R_{PMOS} + D \times R_{NMOS})$ FIGS. 8A, 8B, and 8C consists of the following blocks
(1) circuit block 810 and 820 whose output is cap_pow;

(2) the circuit block 830 and 835 where the circuit block 830 is a comparator which compares resistance power res_pow and capacitance power cap_pow;

(3) circuit block 840 configured to provide signal Vramp, and Vc_buck (4) the comparator 850 whose inputs compare the input signal Vramp and the reference signal Vc_buck;

(5) RS flip-flop 852 and logic block 854, where the input to the SR block is Vreset and Vset, and logic gate 854 is configured to determine finger selection (6) pre-drive circuitry 860A and 860B configured to provide receive signals from logic block 854, and driver circuit element of an output stage PMOS 865A, and NMOS 865B configured to receive signals from the pre-drive circuitry 860A and 860B, respectively;

(7) switch network and resistor/capacitor network 870 to output a sense voltage v_sense;

(8) resistor and capacitor filter block 880 configured to evaluate the inductor current copy ILcopy and average inductor current average IL_avg;

(9) resistive power evaluation logic block 890 configured to receive average inductor current IL_avg;

FIG. 9 describes the method 900 in accordance with the embodiments in the disclosure. A method 900 to improve efficiency in a switching converter with an adaptive output stage consisting of the steps:

A first step 910 (*a*) providing a switching converter, a second step 920 (*b*) evaluate capacitive power loss, a third step 930 (*c*) evaluate resistive power loss, a fourth step 940 (*d*) compare capacitive power loss and resistive power loss, and a fifth step 950 (*e*) adapting the output stage size.

In addition, the method further comprises a circuit block whose output is capacitive power, a circuit block whose output is resistive power, a comparator, a circuit block providing signal Vramp, and Vc_buck, a comparator to compare input signal Vramp and the reference signal Vc_buck, a RS flip-flop, a finger selection logic block, a pre-drive circuit, a driver circuit element, a switch network, a voltage sense resistor/capacitor network, a resistor and capacitor filter block. In addition, the resistor and capacitor filter block are such to evaluate the inductor current copy ILcopy and average inductor current average IL_avg. Additionally, the resistive power evaluation logic block receives average inductor current IL_avg.

The method of the embodiment of an adaptive output stage is applicable to all switching converters (e.g. buck, buck-boost converters and boost converters). As buck-boost converter, that utilizes four switches, the improvement can be more significant.

Alternative embodiments can be implemented which are functionally equivalent. Comparator circuit blocks can be implemented differently to provide faster circuit response. The present disclosure is not dependent on the comparator behavior but the comparison of the resistive and capacitive power.

In actual implementation, pre-drivers circuitry can generate additional capacitive power loss. Alternate embodiments with correction factors may be implemented into circuit blocks for increasing the estimated capacitive loss.

Additionally, alternate embodiments can include PMOS driver voltage sense where $\Delta V = I_{sense} \times R_{PMOS}$ where $R_{PMOS}$ is a smaller replica of PMOS pass transistor.

In this disclosure, the linearity of the output state is not critical to the operability. The adaptive output stage segments does not have to be linear but can be logarithmic—or any function as long as it is monotonic.

The embodiment in FIGS. 4A, 4B, and 4C shows a PMOS pass device and a diode of the buck converter. The invention is also applicable to synchronous switching converters where both NMOS and PMOS pass devices are utilized.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Other advantages will be recognized by those of ordinary skill in the art. The above detailed description of the disclosure, and the examples described therein, has been presented for the purposes of illustration and description. While the principles of the disclosure have been described above in connection with a specific device, it is to be clearly understood that this description is made only by way of example and not as a limitation on the scope of the disclosure.

What is claimed is:

1. A power converter, comprising:
   an adaptive output with a number of selected stages;
   a first adaptive transconductance block whose inputs are electrically coupled to a sensor whose outputs are sense voltage, average load current and power supply voltage configured to evaluate resistive power terms;
   multiplier block configured to multiply a capacitor current by the number of selected stages to generate capacitive power terms; and
   a comparator configured to compare said resistive power terms and said capacitive power terms for determining the number of selected stages of said adaptive output.

2. The power converter of claim 1, further comprising:
   a current sense configured to sense current in said adaptive output;
   said adaptive output adjusted to equalize the losses;
   a slope ramp configured to sense transitions in said adaptive output;
   an error amplifier to compare said adaptive output to a reference voltage;
   a compensation network; and
   a buck SR flip flop configured to generate a duty cycle electrically coupled to said comparator.

3. The power converter of claim 2, wherein said power converter is a buck converter.

4. The power converter of claim 2, wherein an error amplifier output voltage establishes a reset voltage to said buck SR flip-flop.

5. The power converter of claim 4, wherein said buck SR flip-flop is electrically coupled to said adaptive pre-driver.

6. The power converter of claim 1, further comprising an adaptive pre-driver electrically coupled to said adaptive output.

7. The power converter of claim 6, further comprising an inductor electrically coupled to said adaptive output.

8. The power converter of claim 7, wherein said inductor current sense network provides an average output current sense by monitoring said inductor.

9. The power converter of claim 6, wherein said adaptive pre-driver determines a number of selected stages of said adaptive output.

10. The power converter of claim 6, wherein said adaptive pre-driver determines a MOSFET width of said adaptive output.

11. The power converter of claim 6, wherein said adaptive pre-driver is coupled to NAND logic gates.

12. The power converter of claim 11, wherein said NAND logic gates selects an output stage comprising active p-channel MOSFET devices.

13. The power converter of claim 11, wherein said NAND logic gates selects the active p-channel MOSFET in conjunction with a finger selection decoder block.

14. The power converter of claim 13, wherein said average output current sense is provided through an RC filter.

15. The power converter of claim 13, wherein said adaptive output provides a voltage drop sense with ideal switches to sample the PMOS driver transistor when the PMOS driver transistor is in an on-state.

16. The power converter of claim 1, further comprising a capacitor electrically connected to the output.

17. A power converter, comprising:
a an adaptive output with a number of selected stages;
a first adaptive transconductance block whose inputs are electrically coupled to a sensor whose outputs are sense voltage, average load current and power supply voltage configured to evaluate resistive power terms;
a multiplier block configured to multiply a capacitor current by the number of selected stages to generate capacitive power terms; and
a comparator configured to compare said resistive power terms and said capacitive power terms for determining the selection of stages of said adaptive output.

18. The power converter of claim 17, wherein multiplier block is multiplied by a number of fingers of an output stage for evaluation of a capacitive power loss.

19. The power converter of claim 18, wherein said number of selected fingers increases by unity if the resistive power loss is 20% more than the capacitive power loss.

20. The power converter of claim 17, wherein said comparator network configured to evaluate a resistive power loss and a capacitive power loss decides a number of selected fingers.

21. The power converter of claim 20, wherein said number of selected fingers decreases by unity if the resistive power loss is 20% less than the capacitive power loss.

22. The power converter of claim 20, wherein the resistive power loss is between 1 and 100% less than the capacitive power loss.

23. The power converter of claim 17, wherein a current $I_C$ is defined as function of a power supply voltage $V_{DD}$, a reference current $I_R$, and a capacitor voltage $V_{C2}$, equal to $I_C = V_{DD} I_R/V_{C2}$ wherein $V_{DD} I_R/V_{C2}$ is implemented as said second adaptive transconductance block and said power supply voltage $V_{DD}$ as an input of said second adaptive transconductance block.

24. A synchronous switching converter with an adaptive output stage, comprising:
an adaptive output with a number of selected stages;
an adaptive transconductance block configured to evaluate resistive power terms from sense voltage, average load current and power supply voltage;
a multiplier block configured to multiply a capacitor current by the number of selected stages to generate capacitive power terms;
a first comparator configured to compare resistive power and capacitive power terms for determining a selection of stages of said adaptive output; and
a second comparator configured to compare resistive power and capacitive power terms for determining a selection of stages of said adaptive output.

25. The synchronous switching converter of claim 24, further comprising:
a current sense and slope ramp coupled to said adaptive output;
an error amplifier to compare said adaptive output to a reference voltage;
a compensation network;
a buck SR flip flop electrically coupled to said first comparator and said second comparator;
a first and second adaptive pre-driver;
an adaptive output electrically coupled to said first and second adaptive pre-driver;
an inductor electrically coupled to said adaptive output; and
an inductor current sense circuit electrically coupled to said inductor.

26. The synchronous switching converter of claim 24, wherein said adaptive output comprises a first and second output transistor.

27. The synchronous switching converter of claim 26, wherein said first output transistor is a PMOS transistor and said second output transistor is a NMOS transistor.

28. The synchronous switching converter of claim 27, wherein said first comparator is coupled to said first output transistor, and said second comparator is coupled to said second output transistor.

29. The synchronous switching converter of claim 28, wherein capacitive and resistive losses of said first output transistor and said second output transistor are evaluated separately.

30. A method of providing a switching converter with an adaptive output stage, comprising the steps of:
(a) providing a switching converter;
(b) evaluating capacitive power loss from a multiplier block wherein a capacitor current is multiplied by a number of selected stages;
(c) evaluating resistive power loss from input signals voltage sense, an average current, and power supply voltage;
(d) comparing said capacitive power loss and said resistive power loss; and
(e) adapting the output stage size.

31. The method of claim 30, wherein said switching converter with said adaptive output stage further comprises a current sense and slope ramp, an error amplifier, a compensation network, a buck SR flip flop, an adaptive pre-driver, an output driver, an inductor, an inductor current sense circuit, an output capacitor; and a comparator network.

32. The method of claim 31, wherein said switching converter is a synchronous switching converter.

33. The method of claim 32, wherein said switching converter further comprises a first and second output transistor.

34. The method of claim 30, wherein said output stage is adapted to equalize the loss values.

35. The method of claim 30, wherein said resistive and capacitive loss terms are compared, wherein the number of active power stages are adjusted to equalize the loss values.

\* \* \* \* \*